US 8,185,659 B2

(12) United States Patent
Kruger et al.

(10) Patent No.: US 8,185,659 B2
(45) Date of Patent: *May 22, 2012

(54) HANDHELD COMPUTER SYSTEM THAT ATTEMPTS TO ESTABLISH AN ALTERNATIVE NETWORK LINK UPON FAILING TO ESTABLISH A REQUESTED NETWORK LINK

(75) Inventors: Mark Kruger, Seattle, WA (US); Stephane Maes, Mountain View, CA (US); Ryan Robertson, Seattle, WA (US); Gavin Peacock, Walnut Creek, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,058

(22) Filed: Jan. 7, 2011

(65) Prior Publication Data

US 2011/0099292 A1   Apr. 28, 2011

Related U.S. Application Data

(63) Continuation of application No. 12/404,334, filed on Mar. 15, 2009, now Pat. No. 7,870,290, which is a continuation of application No. 09/847,720, filed on May 1, 2001, now Pat. No. 7,506,064.

(51) Int. Cl.
*G06F 15/16* (2006.01)
*G06F 12/00* (2006.01)

(52) U.S. Cl. ..................... 709/239

(58) Field of Classification Search ............ 709/203, 709/227–229, 230, 238–251
See application file for complete search history.

(56) References Cited

U.S. PATENT DOCUMENTS

| | | | |
|---|---|---|---|
| 5,428,663 A | 6/1995 | Grimes et al. | 340/7.21 |
| 5,606,596 A | 2/1997 | Jain et al. | 455/433 |
| 5,862,480 A | 1/1999 | Wild et al. | 455/432.2 |
| 5,933,422 A | 8/1999 | Kusano et al. | 370/331 |
| 5,987,521 A * | 11/1999 | Arrowood et al. | 709/239 |
| 6,192,414 B1 | 2/2001 | Horn | 709/239 |
| 6,311,165 B1 | 10/2001 | Coutts et al. | 705/21 |
| 6,356,622 B1 * | 3/2002 | Hassell et al. | 379/1.01 |
| 6,359,866 B1 | 3/2002 | Svensson et al. | 370/331 |
| 6,373,817 B1 * | 4/2002 | Kung et al. | 370/217 |
| 6,400,681 B1 | 6/2002 | Bertin et al. | 370/218 |
| 6,493,321 B1 | 12/2002 | Partridge | 370/242 |
| 6,681,252 B1 | 1/2004 | Schuster et al. | 709/227 |
| 6,721,269 B2 | 4/2004 | Cao et al. | 370/227 |
| 6,735,630 B1 | 5/2004 | Gelvin et al. | 709/224 |
| 6,769,009 B1 | 7/2004 | Reisman | 709/201 |
| 6,865,160 B1 * | 3/2005 | Bare | 370/256 |
| 7,457,233 B1 * | 11/2008 | Gan et al. | 370/216 |
| 7,506,064 B1 * | 3/2009 | Kruger et al. | 709/239 |
| 7,870,290 B2 * | 1/2011 | Kruger et al. | 709/239 |
| 2002/0004843 A1 | 1/2002 | Andersson et al. | 709/238 |
| 2002/0024940 A1 | 2/2002 | Smith | 370/329 |

* cited by examiner

*Primary Examiner* — Zarni Maung
(74) *Attorney, Agent, or Firm* — Berry & Associates P.C.

(57) ABSTRACT

A computer system that attempts to establish an alternative network link upon failing to establish a requested network link is described. The computer system may encounter conditions where access to numerous networks, in particular wireless networks, is not available. Rather than only providing an error message to the user upon a failed attempt to establish the requested network link, the computer system determines whether the user has designated an alternative network link in case the requested network link cannot be established, whereas the alternative network link is selected from the plurality of network links that the computer system is configured to support. If an alternative network link has been designated, the computer system attempts to establish the alternative network link. Hence, the user experience is made smooth and uneventful when the requested network link cannot be established.

14 Claims, 16 Drawing Sheets

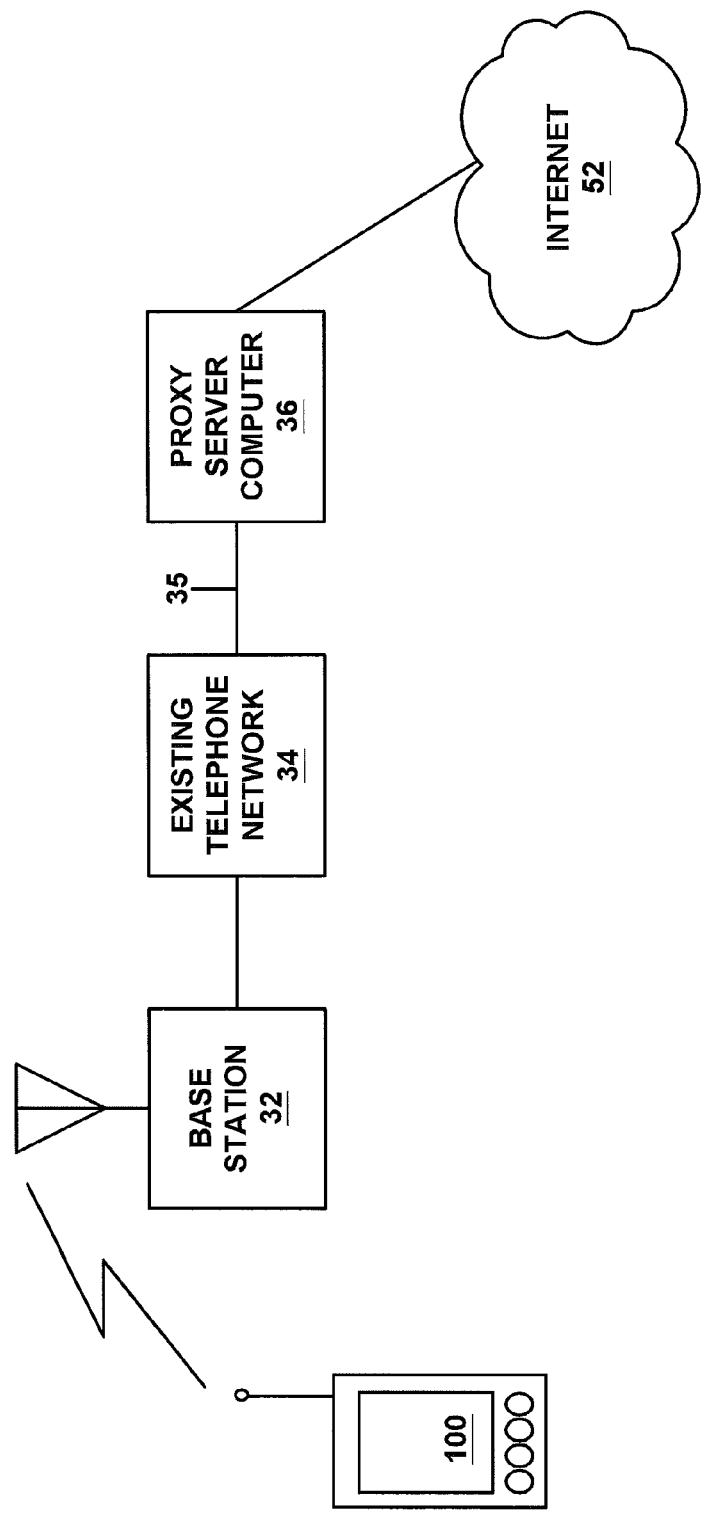

51B

| NETWORK LINK | ALTERNATIVE NETWORK LINK DESIGNATION |
|---|---|
| NETWORK LINK A<br>40 | NETWORK LINK B, NETWORK LINK D, NETWORK LINK C<br>40A |
| NETWORK LINK B<br>50 | NETWORK LINK C<br>50A |
| NETWORK LINK C<br>60 | NETWORK LINK A, NETWORK LINK B, NETWORK LINK D<br>60A |
| NETWORK LINK D<br>70 | NETWORK LINK C, NETWORK LINK A<br>70A |

FIGURE 9

| NETWORK LINK | ALTERNATIVE NETWORK LINK DESIGNATION |
|---|---|
| NETWORK LINK A 140 | NETWORK LINK B 140A |
| NETWORK LINK B 150 | NETWORK LINK A 150A |
| NETWORK LINK C 160 | NETWORK LINK D 160A |
| NETWORK LINK D 170 | NETWORK LINK C 170A |

| NETWORK LINK | ALTERNATIVE NETWORK LINK DESIGNATION |
|---|---|
| NETWORK LINK A 240 | NETWORK LINK C 240A |
| NETWORK LINK B 250 | NETWORK LINK A 250A |
| NETWORK LINK C 260 | NETWORK LINK D 260A |
| NETWORK LINK D 270 | NETWORK LINK A 270A |

| NETWORK LINK | ALTERNATIVE NETWORK LINK DESIGNATION |
|---|---|
| NETWORK LINK A 140 | NETWORK LINK B 140A |
| NETWORK LINK B 150 | NETWORK LINK A 150A |
| NETWORK LINK C 160 | NETWORK LINK D 160A |
| NETWORK LINK D 170 | NETWORK LINK C 170A |

300

| NETWORK LINK | ALTERNATIVE NETWORK LINK DESIGNATION |
|---|---|
| NETWORK LINK A | NETWORK LINK B |
| NETWORK LINK B 150 | NETWORK LINK A 150A |
| NETWORK LINK C | NETWORK LINK D |
| NETWORK LINK D | NETWORK LINK C |

400

| NETWORK LINK | ALTERNATIVE NETWORK LINK DESIGNATION |
|---|---|
| NETWORK LINK A 140 | NETWORK LINK B 140A |
| NETWORK LINK B | NETWORK LINK A |
| NETWORK LINK C | NETWORK LINK D |
| NETWORK LINK D | NETWORK LINK C |

| NETWORK LINK | ALTERNATIVE NETWORK LINK DESIGNATION |
|---|---|
| NETWORK LINK A 240 | NETWORK LINK C 240A |
| NETWORK LINK B 250 | NETWORK LINK A 250A |
| NETWORK LINK C 260 | NETWORK LINK D 260A |
| NETWORK LINK D 270 | NETWORK LINK A 270A |

600

| NETWORK LINK | ALTERNATIVE NETWORK LINK DESIGNATION |
|---|---|
| NETWORK LINK A | NETWORK LINK C |
| NETWORK LINK B | NETWORK LINK A |
| NETWORK LINK C 260 | NETWORK LINK D 260A |
| NETWORK LINK D | NETWORK LINK A |

700

| NETWORK LINK | ALTERNATIVE NETWORK LINK DESIGNATION |
|---|---|
| NETWORK LINK A | NETWORK LINK C |
| NETWORK LINK B | NETWORK LINK A |
| NETWORK LINK C | NETWORK LINK D |
| NETWORK LINK D 270 | NETWORK LINK A 270A |

UNABLE TO ESTABLISH THE REQUESTED NETWORK LINK.
PROCEED TO ESTABLISH THE ALTERNATIVE NETWORK LINK?

OK
910

CANCEL
920

FIGURE 13

HANDHELD COMPUTER SYSTEM THAT ATTEMPTS TO ESTABLISH AN ALTERNATIVE NETWORK LINK UPON FAILING TO ESTABLISH A REQUESTED NETWORK LINK

CROSS REFERENCE TO RELATED APPLICATIONS

This application is a continuation application of application Ser. No. 12/404,334, entitled "HANDHELD COMPUTER SYSTEM THAT ATTEMPTS TO ESTABLISH AN ALTERNATIVE NETWORK LINK UPON FAILING TO ESTABLISH A REQUESTED NETWORK LINK," filed Mar. 15, 2009, which is a continuation application of application Ser. No. 09/847,720, entitled "HANDHELD COMPUTER SYSTEM THAT ATTEMPTS TO ESTABLISH AN ALTERNATIVE NETWORK LINK UPON FAILING TO ESTABLISH A REQUESTED NETWORK LINK," filed May 1, 2001, now U.S. Pat. No. 7,506,064, all assigned to the assignee of the present application. The subject matter in the above-identified co-pending and commonly owned application(s) is incorporated herein by reference.

BACKGROUND OF THE INVENTION

1. Field of the Invention

The present invention generally relates to the field of computer systems. More particularly, the present invention relates to the field of network functionality that attempts to establish a requested network link or, if necessary, attempts to establish any other alternative network link that a user has previously designated for the requested network link.

2. Related Art

Computers and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system or device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and information from all over the world.

The functionality of an electronic system (e.g., a palmtop computer system, a desktop computer system, a cellular phone, a pager, etc.) is enhanced by including an electronic display device. On occasion, the electronic system includes one or more communication ports for exchanging or sharing data with other electronic systems or with a network. For example, an infrared (IR) communication port, a RF (radio frequency) communication port, or other type of communication port can be incorporated into the electronic system. A communication port is positioned in the electronic system according to a variety of factors, such as space requirements, industry standards, and convenience to a user.

A personal digital assistant (commonly referred to as a PDA) is a palmtop computer system. It is appreciated that the personal digital assistant is a portable handheld device that is used as an electronic organizer which has the capability to store a wide range of information that includes daily appointments, numerous telephone numbers of business and personal acquaintances, and various other information. Moreover, the personal digital assistant can also access information from the Internet, as mentioned above. In particular, the personal digital assistant can browse Web pages located on the Internet. Typically, the personal digital assistant includes an electronic display device having a display area (e.g., a screen) that is smaller in size relative to a display area associated with a standard-sized electronic display device (e.g., 15 inch monitor, 17 inch monitor, etc.) which is part of a desktop computer system or a laptop computer system.

Typically, the personal digital assistant includes one or more communication ports (e.g., an IR communication port, a RF (radio frequency) communication port, a serial communication port, an Ethernet communication port, a cellular phone communication port, etc.). For example, a IR communication port is positioned along the top edge of the personal digital assistant so that a user can conveniently view and read the electronic display device and at the same time communicate with another electronic system located across from the user while the user holds the personal digital assistant.

Moreover, the network capability of the personal digital assistant enhances a user's experience, As new network technologies emerge, additional network functionality is incorporated into the personal digital assistant. For example, a variety of wireless networks are being deployed to serve a wide range of devices including a personal digital assistant. Having access to many different types of networks improves the productivity of the user and increases demand for the personal digital assistant. However, the personal digital assistant may not always be able to establish a network link with some of these emerging networks because of numerous reasons. Some of these reasons include: insufficient network capacity, technical network difficulties, and slow rollout of the coverage area of the emerging networks.

Typically, if the personal digital assistant fails to establish a requested network link, the user has to reconfigure the network functionality of the personal digital assistant so that, on a subsequent attempt to establish a network link, another type of network link is attempted. If the personal digital assistant fails again to establish the requested network link, the user again has to reconfigure the network functionality of the personal digital assistant so that, on another attempt to establish a network link, yet another type of network link is attempted. Such intervention by the user degrades the user experience and increases user frustration. Moreover, the situation can only get worse in the future with the continual development of more network technologies.

SUMMARY OF THE INVENTION

A computer system that attempts to establish an alternative network link upon failing to establish a requested network link is described. The computer system may encounter conditions where access to numerous networks, in particular wireless networks, is not available. Rather than only providing an error message to the user upon a failed attempt to establish the requested network link, the computer system determines whether the user has designated an alternative network link in case the requested network link cannot be established, whereas the alternative network link is selected from the plurality of network links that the computer system is configured to support. If an alternative network link has been designated, the computer system attempts to establish the alternative network link. Hence, the user experience is made smooth and uneventful when the requested network link cannot be established.

In a chain implementation, the user designates one or several alternative network links for a particular network link. Upon failure to establish the particular network link, the computer system sequentially attempts to establish one of the alternative network links. The user has wide flexibility. For example, the user can omit providing an alternative network link for some of the network links supported by the computer system. Moreover, the user can designate any number of alternative network links for any of the network links supported by the computer system.

In a loop implementation, the user designates one or several alternative network links for a particular network link. The computer system attempts the particular network link and then, if the particular network link cannot be established, attempts to establish the alternative network link(s). If no network link was established, the computer system again attempts to establish the particular network link and, if necessary, again attempts to establish the alternative network link(s). The computer system can continue this loop until a network link is established or until the user decides to stop the loop.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principle; of the present invention.

FIG. 1 illustrates a block diagram of a first exemplary network environment including a personal digital assistant on which the present invention can be practiced.

FIG. 9 illustrates a plurality of network links each having an alternative network link designation in accordance with an embodiment of the present invention.

FIG. 10 illustrates a first plurality of network links each having an alternative network link designation and a second plurality of network links each having an alternative network link designation in accordance with an embodiment of the present invention.

FIG. 11 illustrates operation of a first loop implementation for attempting multiple network links in accordance with an embodiment of the present invention.

FIG. 12 illustrates operation of a second loop implementation for attempting multiple network links in accordance with an embodiment of the present invention.

FIG. 13 illustrates a message displayed to a user in accordance with an embodiment of the present invention.

Figure 2A:
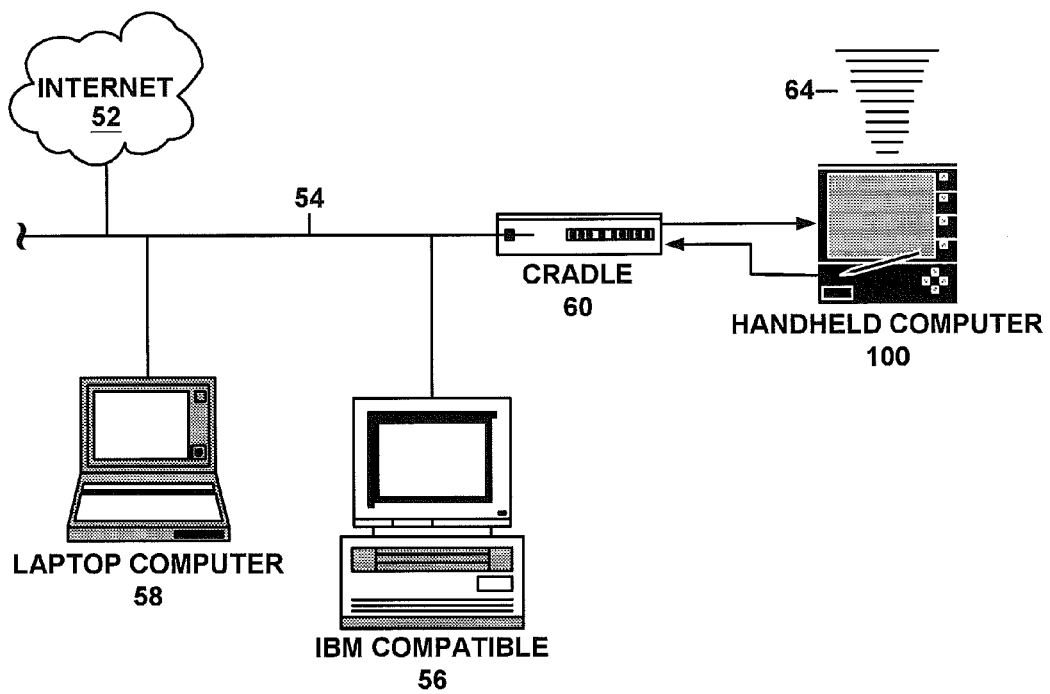
FIG. 2A illustrates a block diagram of a second exemplary network environment including a personal digital assistant on which the present invention can be practiced, whereas the personal digital assistant is coupled to other computer systems and the Internet via a cradle device.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the description of the present invention will focus on a personal digital assistant or handheld computer system, the present invention can be practiced on other types of computer systems.

Computer System Environment

One of the common types of computer systems which can be used to practice the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Alternatively, the personal digital assistant can have a network port (e.g., an Ethernet Local Area Network (LAN) port) to access a network coupled to the Internet, enabling the personal digital assistant to have electronic mail (e-mail) capabilities over the Internet along with other internet capabilities. Moreover, an advanced personal digital assistant can have Internet capabilities over a wireless communication interface (e.g., radio interface). In particular, the personal digital assistant can be used to browse Web pages located on the Internet. The personal digital assistant can be coupled to a networking environment. It should be appreciated that embodiments of the present 15 invention are well suited to operate within a wide variety of computer systems, some of which can be communicatively coupled to a networking environment.

FIG. 1 is a block diagram of a first exemplary network environment 50 including a personal digital assistant 100 on which the present invention can be practiced. The personal digital assistant 100 is also known as a palmtop or palm-sized electronic system or computer system. Here, the personal digital assistant 100 has the ability to transmit and receive data and information over a wireless communication interface (e.g., a radio interface). The personal digital assistant 100 is one exemplary computer system on which the present invention can operate. The present invention can operate on any other type of computer system.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Alternatively, a private telephony system, a private data network, or any other communication network can be implemented as alternatives for the existing public telephone network 34 Furthermore, proxy server computer system 36 is coupled to the Internet 52, thereby enabling the personal digital assistant 100 to communicate with the Internet 52. Alternatively, a router, a switch, or any other interface device can be implemented as alternatives for the proxy server computer system 36. It should be appreciated that within the present embodiment, one of the functions of proxy server 36 is to perform operations over the Internet 52 on behalf of the personal digital assistant 100. For example, proxy server 36 has a particular Internet address and acts as a proxy device for the personal digital assistant 100 over the Internet 52. It should be further appreciated that other communications networks may be utilized in practicing the present invention.

The data and information which are communicated between base station 32 and the personal digital assistant 100 are a type of information and data that can conventionally be transferred and received over a public telephone wire network system. However, a wireless communication interface is utilized to communicate data and information between the personal digital assistant 100 and base station 32. It should be appreciated that one embodiment of a wireless communication system in accordance with the present invention is the Mobitex wireless communication system.

FIG. 2A illustrates a block diagram of a second exemplary network environment 51A including a personal digital assistant 100 on which the present invention can be practiced, whereas the personal digital assistant 100 is coupled to other computer systems and the Internet via a cradle device. Network system 51A comprises a host computer system 56 which can either be a desktop computer system as shown, or, alternatively, can be a laptop computer system 58. Optionally, more than one host computer system 56 can be used within network system 51A. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the personal digital assistant 100. Cradle 60 provides an electrical and mechanical communication interface between bus 54 (and any device coupled to bus 54) and the personal digital assistant 100 for two-way communications. The personal digital assistant 100 also contains a wireless infrared communication mechanism 64 for sending and receiving information from other devices.

Figure 2B:
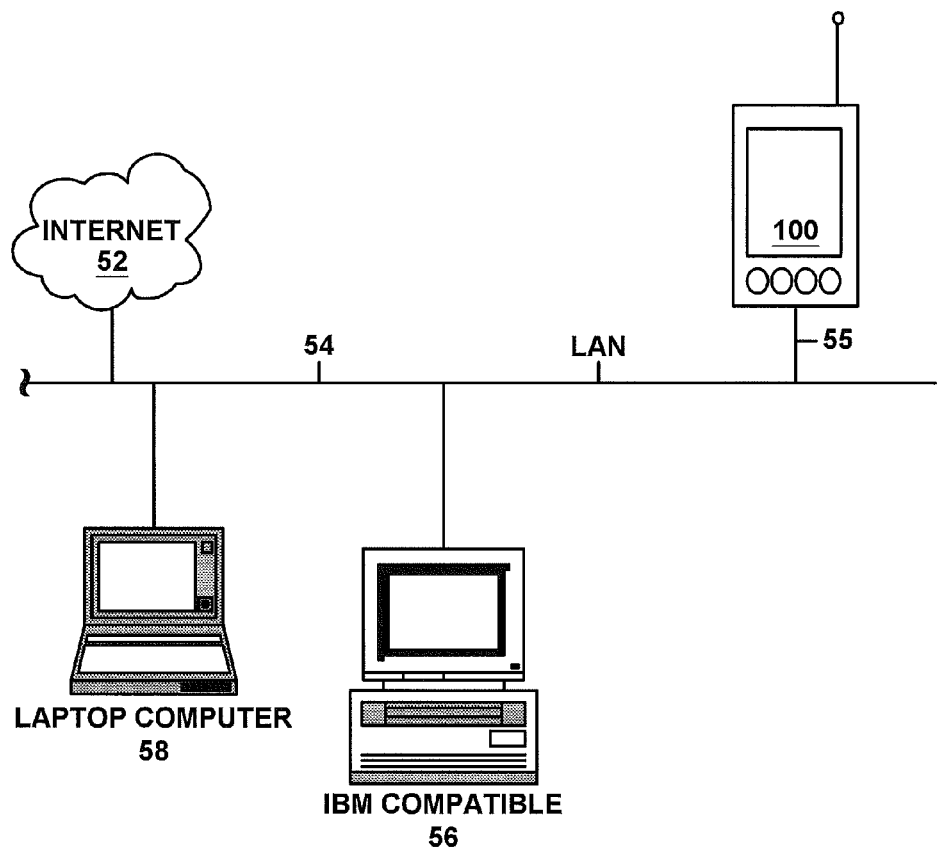
FIG. 2B illustrates a block diagram of a third exemplary network environment including a personal digital assistant on which the present invention can be practiced, whereas the personal digital assistant is coupled to other computer systems and the Internet via a network port.

FIG. 2B illustrates a block diagram of a third exemplary network environment 51B including a personal digital assistant; 100 on which the present invention can be practiced, whereas the personal digital assistant 100 is coupled to other computer systems 58 and 56 and the Internet 52 via a network port 55. As depicted in FIG. 2B, the personal digital assistant 100 includes a network port 55 to couple to a communication bus 54, whereas the desktop computer system 56 and the laptop computer system, as well as the Internet 52, can be coupled to the communication bus 54. The communication bus 54 can be implemented in any format, such as an Ethernet Local Area Network (LAN).

With reference to FIGS. 1, 2A, and 2B, it is appreciated that the personal digital assistant 100 can be used in a network environment combining elements of networks 50, 51A, and 51B. That is, the personal digital assistant 100 can include a wireless infrared communication mechanism, a signal (e.g., radio) receiver/transmitter device, and a network port.

Figure 3:
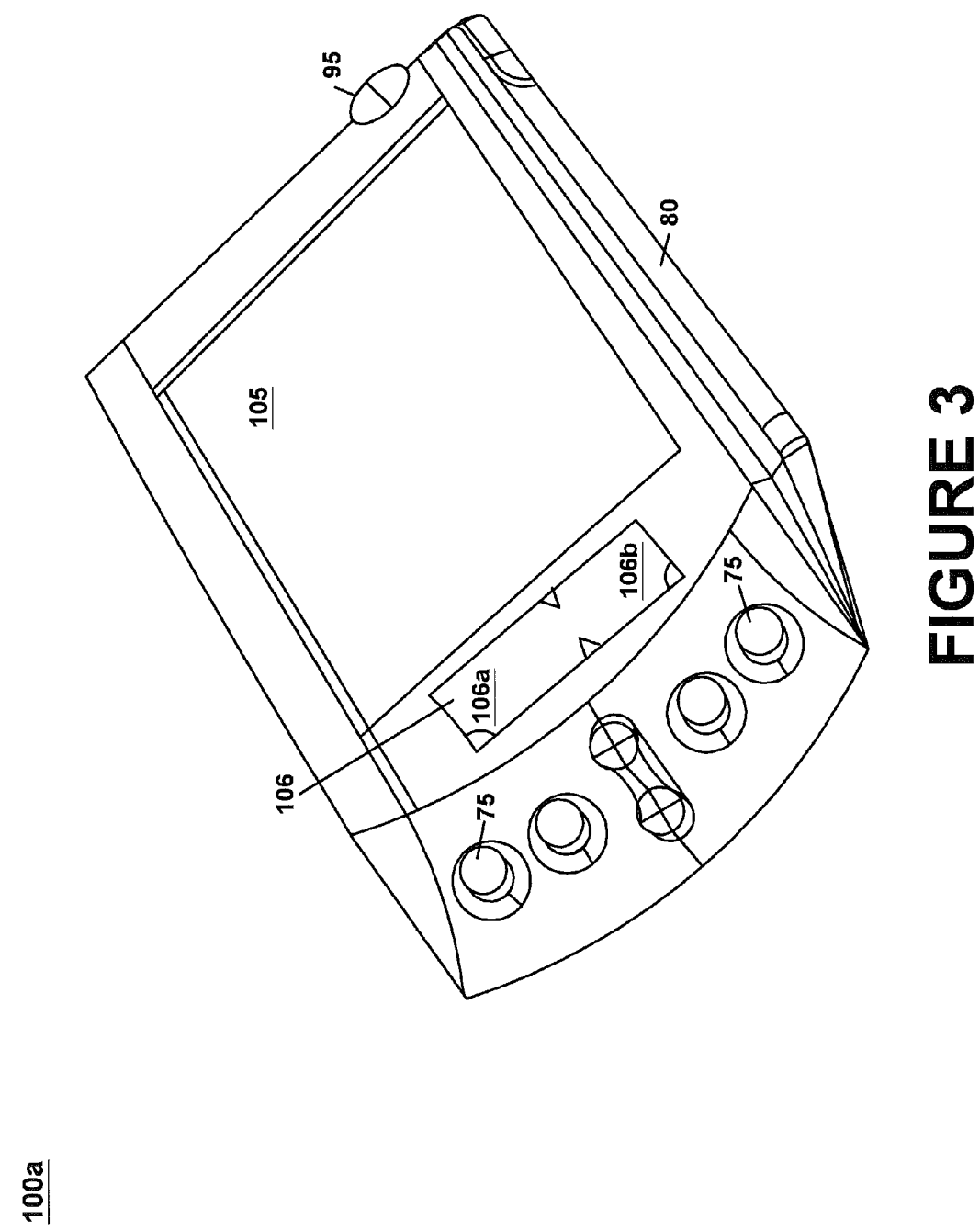
FIG. 3 illustrates a top side perspective view of a personal digital assistant on which the present invention can be practiced.

FIG. 3 is a perspective illustration of the top face 100a of one embodiment of the personal digital assistant or palmtop computer system 100. The top face 100a has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100a also has one or more dedicated and/or programmable buttons 75 for selecting information and causing the computer system to implement functions. The an/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the exemplary personal digital assistant 100.

FIG. 3 also illustrates a handwriting recognition pad 106 or "digitizer" containing two regions 106a and 106b. Region 106a is for the drawing of alphabetic characters therein for automatic recognition, and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 4:
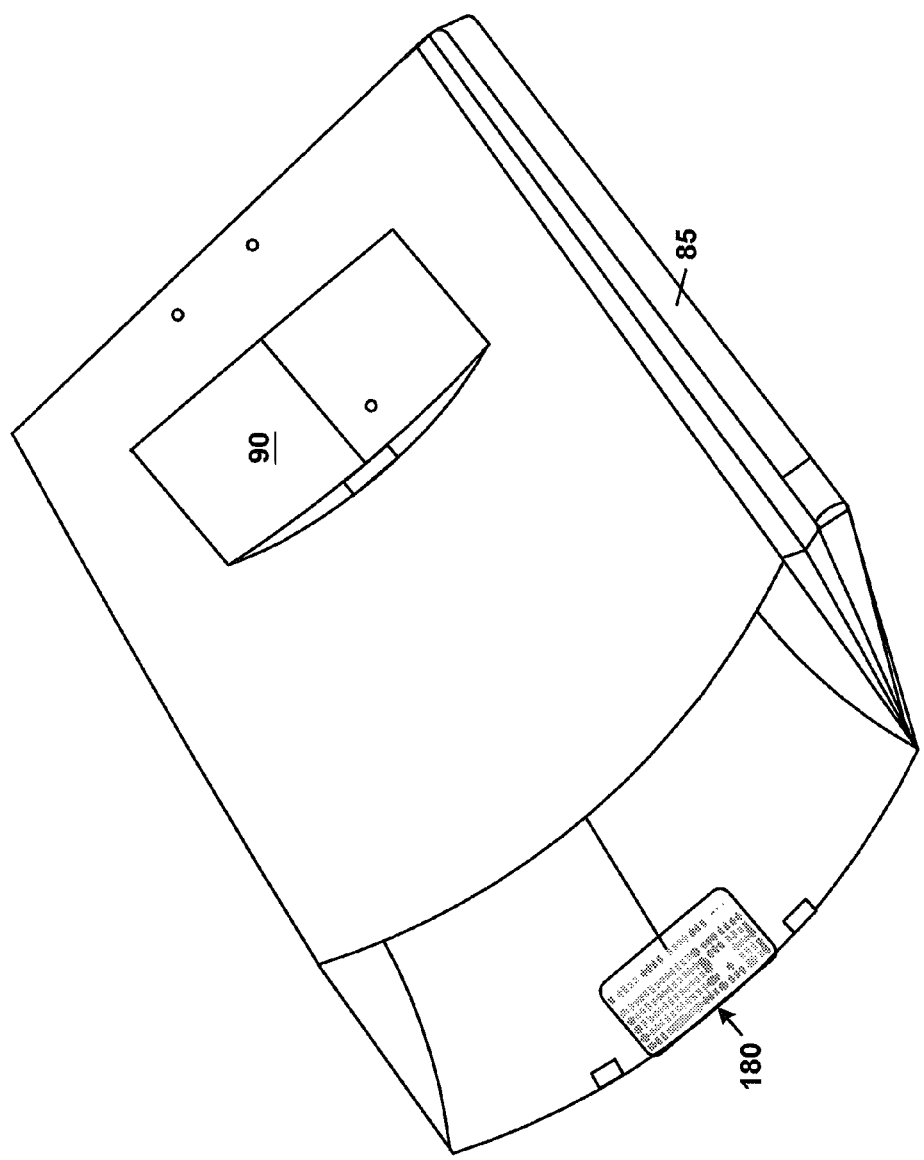
FIG. 4 illustrates a bottom side perspective view of the personal digital assistant of FIG. 3.

FIG. 4 illustrates the bottom side 100b of one embodiment of the personal digital assistant or palmtop computer system 100 that can be used in accordance with various embodiments of the present invention. An extendible antenna 85 is shown, and also a battery storage compartment door 90 is shown. The antenna 85 enables the personal digital assistant 100 to be communicatively coupled to a network environment (as shown in FIG. 1) thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 5:
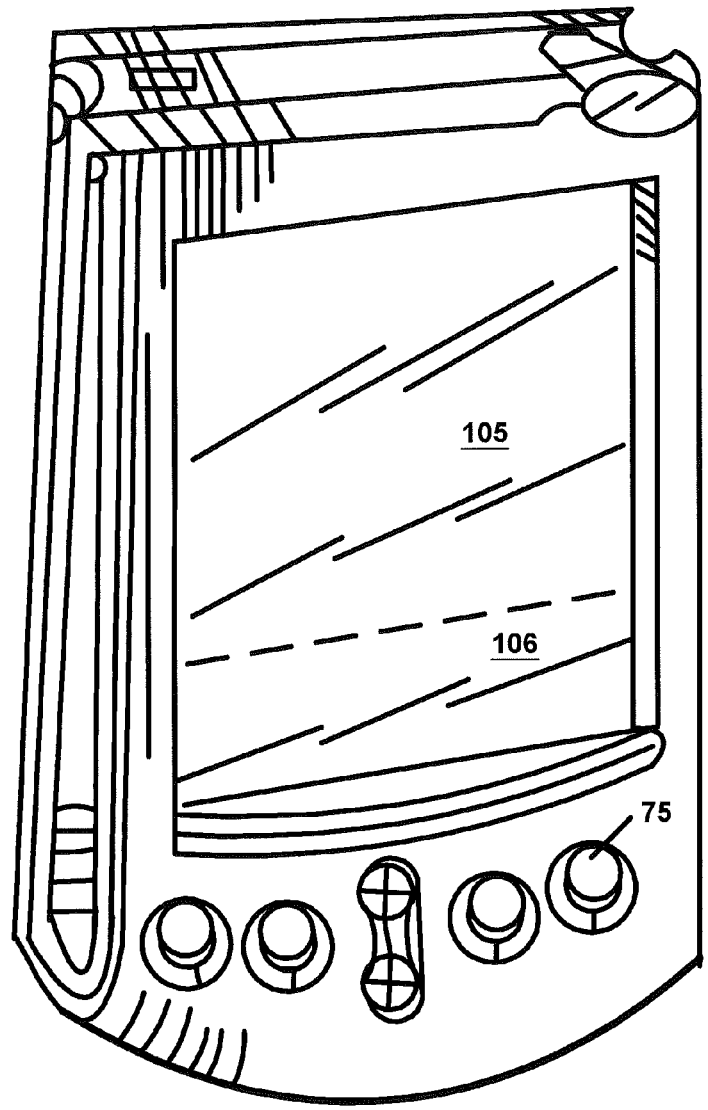
FIG. 5 illustrates a perspective view of another personal digital assistant on which the present invention can be practiced.

FIG. 5 illustrates a perspective view of another personal digital assistant 100 on which the present invention can be practiced. Here, the personal digital assistant 100 includes a display screen 105 and a handwriting recognition pad 106 or "digitizer, as well one or more dedicated and/or programmable buttons 75 for selecting information and causing the personal digital assistant 100 to implement particular functions. It should be understood that the present invention can be practiced on personal digital assistants having other configurations and designs.

Figure 6:
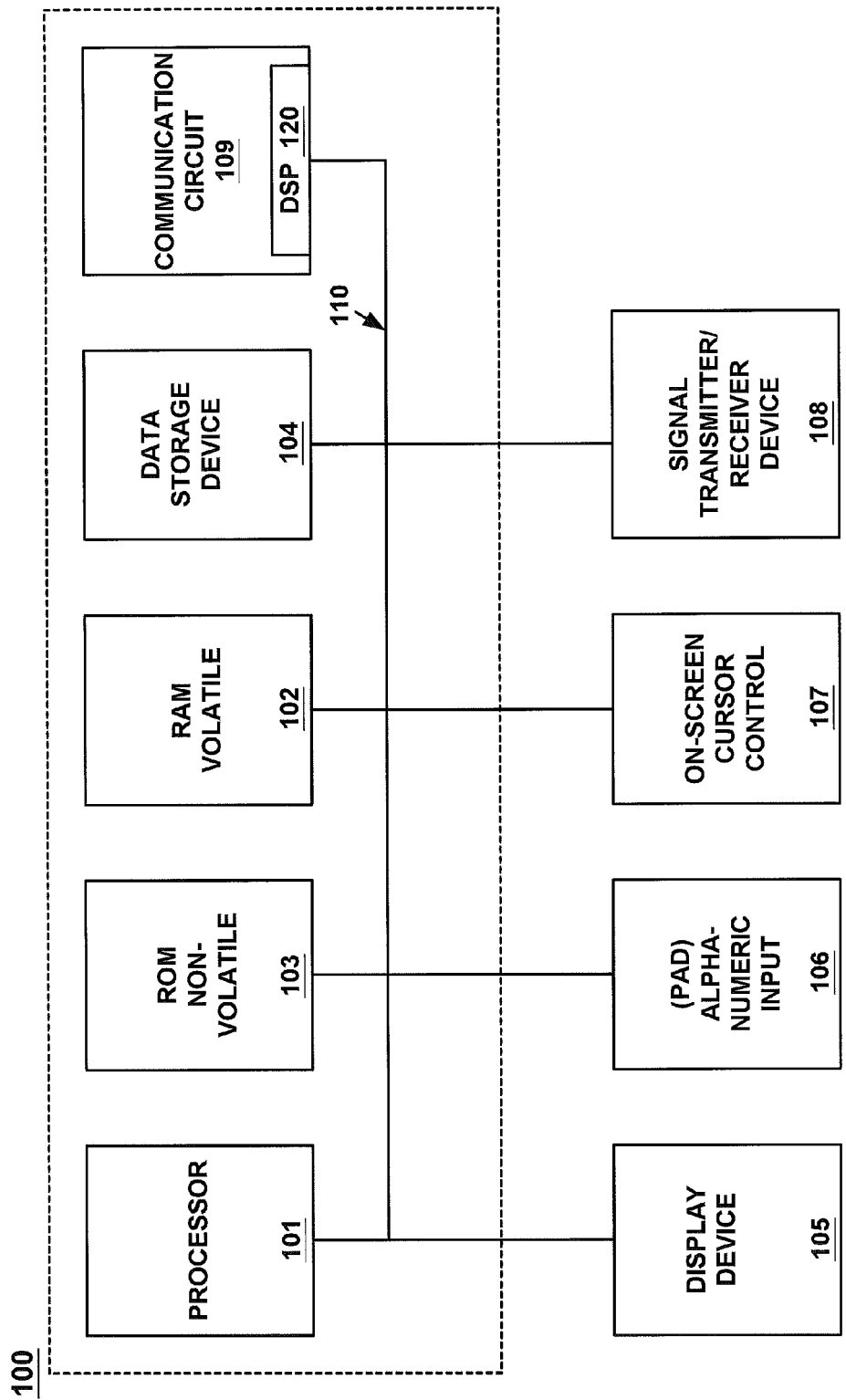
FIG. 6 illustrates a logical circuit block diagram of a personal digital assistant on which the present invention can be practiced.

Referring now to FIG. 6, portions of the personal digital assistant 100 are comprised of computer-readable and computer-executable instructions which reside, for example, in computer-readable media of the personal digital assistant 100.

FIG. 6 is a block diagram of interior components of a personal digital assistant 100 on which the present invention can be practiced. The personal digital assistant 100 includes an address/data bus 110 for communicating information, a central processor 101 coupled to the bus 110 for processing information and instructions, a volatile memory 102 (e.g., random access memory, static RAM, dynamic RAM, etc) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. The personal digital assistant 100 also includes an optional data storage device 104 (e.g., memory card, hard drive, etc.) coupled with the bus 110 for storing information and instructions. Data storage device 104 can be removable. As described above, the personal digital assistant 100 also includes an electronic display device 105 coupled to the bus 110 for displaying information to the computer user. In one embodiment, PC board 225 can include the processor 101, the bus 110, the ROM 103 and the RAM 102.

With reference still to FIG. 6, the personal digital assistant 100 also includes a signal transmitter/receiver device 108 which is coupled to bus 110 for providing a communication link between the personal digital assistant 100 and a network environment (e.g., network environments 50 and 51 of FIGS. 1 and 2, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, the personal digital assistant 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in the personal digital assistant 100 of FIG. 6 is an optional alphanumeric input device 106 which in one implementation is a handwriting recognition pad 106 ("digitizer") having regions 106a and 106b (FIG. 3), for instance. Alphanumeric input device 106 can communicate information and command selections to processor 101. The personal digital assistant 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with the personal digital assistant 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 7:
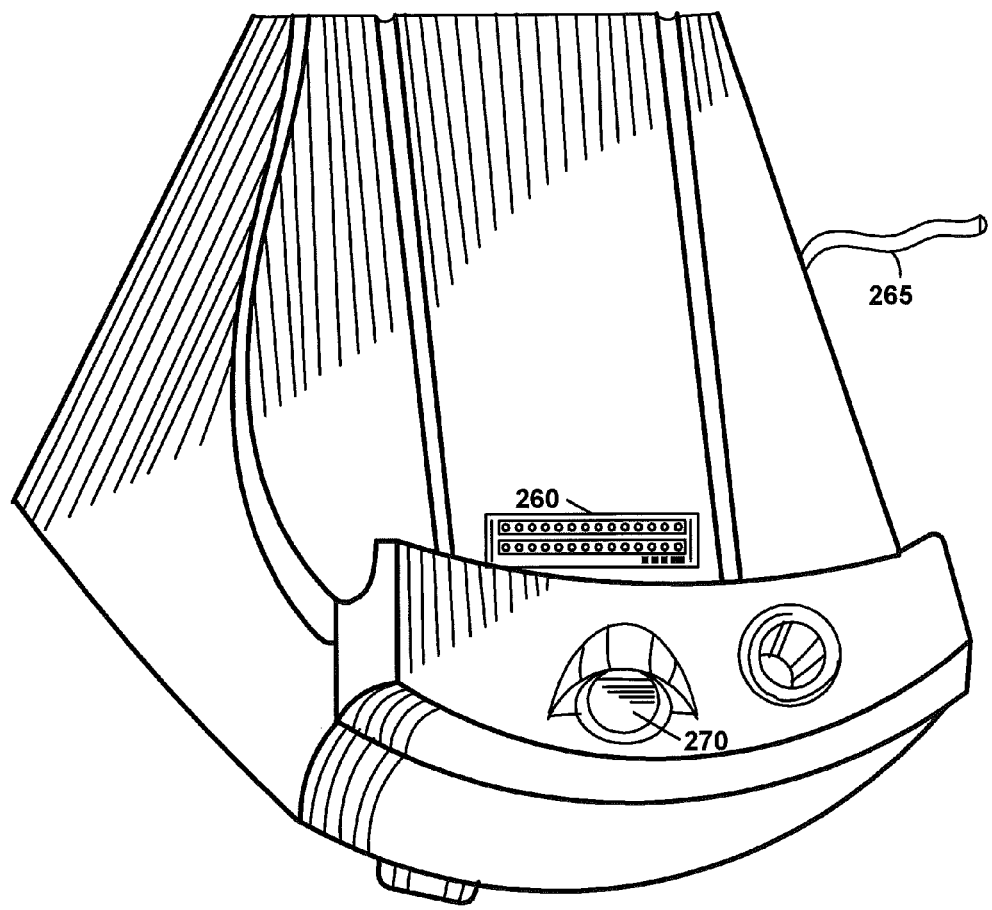
FIG. 7 illustrates a perspective view of a cradle device for connecting the personal digital assistant to other systems via a communication interface.

FIG. 7 is a perspective illustration of one embodiment of the cradle 60 for receiving the personal digital assistant or palmtop computer system 100. Cradle 60 includes a mechanical and electrical interface 260 for interfacing with communication interface 108 (FIG. 4) of the personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Attempting an Alternative Network Link Upon Failure to Establish a Requested Network Link Although the description of the present invention will focus on a personal digital assistant or handheld computer system, the present invention can be practiced on other types of computer systems.

In an embodiment, the personal digital assistant 100 attempts to establish an alternative network link upon failing to establish a requested network link. The personal digital assistant 100 may encounter conditions where access to numerous networks, in particular wireless networks, is not available. Rather than only providing an error message to the user upon a failed attempt to establish the requested network link, the personal digital assistant 100 determines whether the user has designated an alternative network link in case the requested network link cannot be established, whereas the alternative network link is selected from the plurality of network links that the personal digital assistant 100 is configured to support. If an alternative network link has been designated, the personal digital assistant 100 attempts to establish the alternative network link. Therefore, the user experience is made smooth and uneventful when the requested network link cannot be established. The present invention provides a simple manner to improve the user experience and reduce interruptions which annoy and frustrate the user.

In an embodiment, the personal digital assistant 100 can be configured to support a plurality of network links for communicating with numerous networks. These network links utilize a variety of network protocols and require a variety of physical connections (i.e., wired and wireless) to establish communication with the numerous networks. Examples of network protocols include: PPP (Point-to-Point Protocol), Ethernet, GPRS (General Packet Radio Service), TCP/IP (Transmission Control Protocol/Internet Protocol), Bluetooth wireless communication protocol, and IPX/SPX (Internetwork Packet Exchange/Sequenced Packet Exchange). Examples of physical connections include: wireless phone communication [e.g., GSM (Global System for Mobile Communications), CDMA (Code Division Multiple Access), TDMA (Time Division Multiple Access)], wired phone communication, serial line communication, network cable communication, parallel line communication, and wireless communication.

As discussed above, numerous wireless networks are being deployed throughout the country. The personal digital assistant 100 can be configured to support several of these wireless networks. However, the numerous wireless networks may not be available in all regions of the country. The present invention enables the personal digital assistant 100 to easily initiate an alternative network link (e.g., to a wireless network or a wired network) when the requested network link (e.g., to a wireless network) cannot be established because any of a variety of reasons, such as insufficient network capacity, technical network difficulties, and spotty network coverage.

Figure 8:
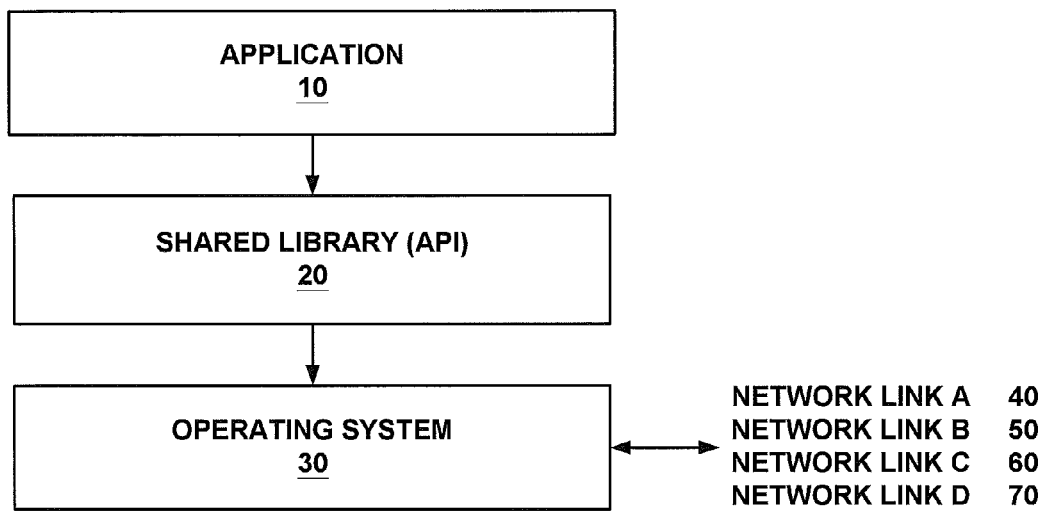
FIG. 8 illustrates a software environment on which the present invention can be practiced.

FIG. 8 illustrates a software environment on which the present invention can be practiced. In an embodiment, the software environment of the personal digital assistant 100 includes an application layer 10, a shared library layer 20, and an operating system layer 30. This software environment provides the network functionality of the personal digital assistant 100. Generally, an application 10 requests establishment of a network link (e.g., network link A 40, network link B 50, network link C 60, or network link D 70) in response to an action by the user or any other action. In particular, the application 10 sends a network open request (or makes a call) to a particular shared library 20 (e.g., a network library 20), whereas the shared library 20 is a code resource database which makes available a variety of API services that applications 10 can request. Specifically, the network library 20 makes available functions which perform network-related tasks, such as opening a network link, sending data via the network link, reading data from the network link, etc.

In an embodiment, the network library 20 interfaces with the operating system 30 to establish (or open) the requested network link (e.g., network link A 40, network link B 50, network link C 60, or network link D 70). If the network library 20 (which has network open code) fails to establish the requested network link due to any of a variety of reasons (e.g., a network-related error, a time out error, a non-fatal operating system error), the network library 20 subsequently attempts to establish an alternative network link which has been previously designated by the user for the requested network link. It is possible for the user to omit designating the alternative network link. Moreover, the user can designate multiple alternative network links in case the first alternative network link cannot be established. Thus, the present invention gives the user a simple way to configure the personal digital assistant 100 to try an alternative network link when his/her first choice of network link is not available. It should be understood that the present invention can be practiced in other types of software environments.

FIG. 9 illustrates a plurality of network links supported by a personal digital assistant 100, each having an alternative network link designation in accordance with an embodiment of the present invention. Here, the personal digital assistant 100 supports network link A 40 (e.g., a wireless TCP/IP link), network link B 50 (e.g., a wired TCP/IP link), network link C 60 (e.g., a Bluetooth wireless link), and network link D 70 (e.g., wireless IPX/SPX link).

Moreover, FIG. 9 illustrates a chain implementation. In the chain implementation, the user designates one or several alternative network links for a network link. In particular, the user selected network link B, network link D, and network link C as the alternative network link designation 40A for network link A 40. The user selected network link C as the alternative network link designation 50A for network link B 50. Moreover, the user selected network link A, network link B, and network link D as the alternative network link designation 60A for network link C 60. In addition, the user selected network link C and network link A as the alternative network link designation 70A for network link D 70. Upon failure to establish the network link, the personal digital assistant 100 sequentially attempts to establish one of the alternative network links.

For example, in the case where the requested network link is the network link A, if the personal digital assistant 100 fails to establish the network link A 40, the personal digital assistant 100 attempts to establish the network link B 50 based on the order specified in the alternative network link designation 40A. Then, if the personal digital assistant 100 fails to establish the network link B 50, the personal digital assistant 100 attempts to establish the network link D 70 based on the order specified in the alternative network link designation 40A. Moreover, if the personal digital assistant 100 fails to establish the network link D 70, the personal digital assistant 100 attempts to establish the network link C 60 based on the order specified in the alternative network link designation 40A. Thus, the user is able to chain together a list of alternative network links for the personal digital assistant 100 to attempt in case the requested network link cannot be established. It is possible to proceed in a loop by attempting again to establish the network link A 40 if the network link C 60 cannot be established. The personal digital assistant 100 proceeds in a similar manner in the case where the requested network link is the network link B 50, the network link C 60, or the network link D 70.

The user has wide flexibility in creating the alternative network link designations 40A, 50A, 60A, and 70A, as is evident in FIG. 9. For example, the user can omit providing an alternative network link for some of the network links supported by the personal digital assistant 100. Moreover, the user can designate any number of alternative network links for any of the network links supported by the personal digital assistant 100. The alternative network link designations 40A, 50A, 60A, and 70A reflect choices made by the user based on the user's priorities and the network links supported by the personal digital assistant 100. It should be understood the present invention can be practiced with other number of network links.

FIG. 10 illustrates a first plurality of network links 140, 150, 160, and 170 supported by a personal digital assistant 100, each having an alternative network link designation, and a second plurality of network links 240, 250, 260, and 270 supported by a personal digital assistant 100, each having an alternative network link designation, in accordance with an embodiment of the present invention.

Moreover, FIG. 10 illustrates a first loop implementation in the case of the first plurality of network links 140, 150, 160, and 170 supported by a personal digital assistant 100. In the first loop implementation, the user designates an alternative network link for a network link. The personal digital assistant 100 attempts to establish the network link (e.g., network link A 140, network link B 150, network link C 160, or network link D 170) and then, if the network link cannot be established, attempts to establish the respective alternative network link (e.g., alternative network link designation 140A, 150A, 160A, or 170A). If no network link was established, the personal digital assistant 100 again attempts to establish the network link and, if necessary, again attempts to establish the respective alternative network link. The personal digital assistant 100 can continue this loop until any network link is established, until the user decides to stop the loop, until a predefined number of loop cycles have been performed, or until any other event occurs. Operation of the first loop implementation is depicted in FIG. 11.

In addition, FIG. 10 illustrates a second loop implementation in the case of the second plurality of network links 240, 250, 260, and 270 supported by a personal digital assistant 100. In the second loop implementation, the user creates a loop having several alternative network links. The personal digital assistant 100 attempts the network link (e.g., network link A 240, network link B 250, network link C 260, or network link D 270) and then, if the network link cannot be established, attempts to establish a respective alternative network link (e.g., alternative network link designation 240A, 250A, 260A, or 270A). If the respective alternative network link cannot be established, the personal digital assistant 100 proceeds to establish the particular alternative network link which is designated for the respective alternative network link. The personal digital assistant 100 proceeds in a similar manner if the particular alternative network link cannot be established. Moreover, the personal digital assistant 100 can continue this loop until any network link is established, until the user decides to stop the loop, until a predefined number of loop cycles have been performed, or until any other event occurs. Operation of the second loop implementation is depicted in FIG. 12.

FIG. 11 illustrates operation of a first loop implementation for attempting multiple network links in accordance with an embodiment of the present invention. For example, (as illustrated in table 200) in the case where the requested network link is the network link A 140, if the personal digital assistant 100 fails to establish the network link A 140, the personal digital assistant 100 attempts to establish the network link B 150 based on the alternative network link designation 140A.

In an embodiment, the personal digital assistant 100 provides a message to the user before proceeding to attempt the network link B 150. FIG. 13 illustrates a message 900 displayed to a user in accordance with an embodiment of the present invention. The message 900 informs the user that the requested network link could not be established. In addition, the message 900 enables the user to control whether the personal digital assistant 100 proceeds to the alternative network link. By selecting the option 910, the user enables the personal digital assistant 100 to attempt to establish the alternative network link. By selecting the option 920, the user stops the loop and prevents the personal digital assistant 100 from attempting to establish the alternative network link.

Continuing, (as illustrated in table 300 and by arrow 10) if the personal digital assistant 100 fails to establish the network link B 150, the personal digital assistant 100 attempts again to establish the network link A 140 based on the alternative network link designation 150A, since the network link A 140 is the respective alternative network link for the network link B 150. The personal digital assistant 100 can display the message 900 (FIG. 13) before proceeding to attempt once again the network link A 140.

Moreover, (as illustrated in table 400 and by arrow 20) if the personal digital assistant 100 fails to establish the network link A 140, the personal digital assistant 100 attempts again to establish the network link B 150 based on the alternative network link designation 140A, since the network link B 150 is the respective alternative network link for the network link A 140. The personal digital assistant 100 can display the message 900 (FIG. 13) before proceeding to attempt once again the network link B 150. The first loop implementation can continue in a manner illustrated in tables 200, 300, and 400.

Moreover, the personal digital assistant 100 proceeds in a similar manner in the case where the requested network link is the network link B 150, the network link C 160, or the network link D 170.

FIG. 12 illustrates operation of a second loop implementation for attempting multiple network links in accordance with an embodiment of the present invention. For example, (as illustrated in table 500) in the case where the requested network link is the network link A 240, if the personal digital assistant 100 fails to establish the network link A 240, the personal digital assistant 100 attempts to establish the network link C 260 based on the alternative network link designation 240A.

In an embodiment, the personal digital assistant 100 provides a message 900 (FIG. 13) to the user before proceeding to attempt the network link C 260.

Continuing, (as illustrated in table 600 and by arrow 110) if the personal digital assistant 100 fails to establish the network link C 260, the personal digital assistant 100 attempts to establish the network link D 270 based on the alternative network link designation 260A, since the network link D 270 is the respective alternative network link for the network link C 260. The personal digital assistant 100 can display the message 900 (FIG. 13) before proceeding to attempt the network link C 260.

Moreover, (as illustrated in table 700 and by arrow 120) if the personal digital assistant 100 fails to establish the network link D 270, the personal digital assistant 100 attempts again to establish the network link A 240 based on the alternative network link designation 270A, since the network link A 240 is the respective alternative network link for the network link D 270. The personal digital assistant 100 can display the message 900 (FIG. 13) before proceeding to attempt once again the network link A 240. The second loop implementation can continue in a manner illustrated in tables 500, 600, and 700.

Moreover, the personal digital assistant 100 proceeds in a similar manner in the case where the requested network link is the network link B 250, the network link C 260, or the network link D 270.

Figure 14:
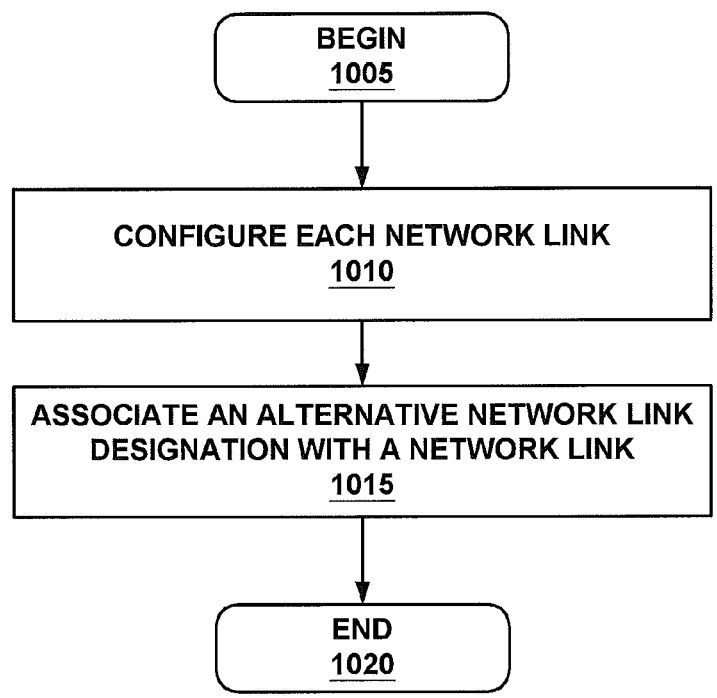
FIG. 14 illustrates a flow chart showing a method of enabling a user to provide the alternative network link designations for the network links supported by a personal digital assistant in accordance with an embodiment of the present invention.

FIG. 14 illustrates a flow chart showing a method 1000 of enabling a user to provide the alternative network link designations for the network links supported by a personal digital assistant 100 in accordance with an embodiment of the present invention.

At step 1005, the method 100 in accordance with an embodiment of the present invention begins.

Continuing, at step 1010, each network link supported by the personal digital assistant 100 is appropriately configured in the personal digital assistant 100 so that the personal digital assistant 100 can initiate and establish the network link when requested by an application or the user. For example, a network link set-up application can be invoked to configure each network link. The network link set-up process includes: identifying the type of network link, inputting network protocol values, and providing any other information (e.g., type of modem, number to be dialed by a wired or wireless modem, initialization string, etc.) to enable the personal digital assistant 100 to initiate and establish the network link.

At step 1015, the user designates one or several alternative network links for a network link supported by the personal digital assistant 100, whereas the alternative network link is selected from the plurality of network links that the personal digital assistant 100 is configured to support. Also, the user can specify whether the personal digital assistant 100 proceeds as described with respect to FIG. 9 (i.e., chain implementation), as described with respect to FIG. 11 (i.e., first loop implementation), or as described with respect to FIG. 12 (i.e., second loop implementation). The user can omit providing an alternative network link for some of the network links supported by the personal digital assistant 100. Moreover, the user can designate any number of alternative network links for any of the network links supported by the personal digital assistant 100. Additionally, each network link and its corresponding alternative network link designation are associated such that if the network link cannot be establish, the personal digital assistant 100 attempts to establish another network link based on the alternative network link designation. In an embodiment, the alternative network link designation is a user-defined preference property stored with the configuration information of the corresponding network link.

At step 1020, the method 1000 ends.

Figure 15:
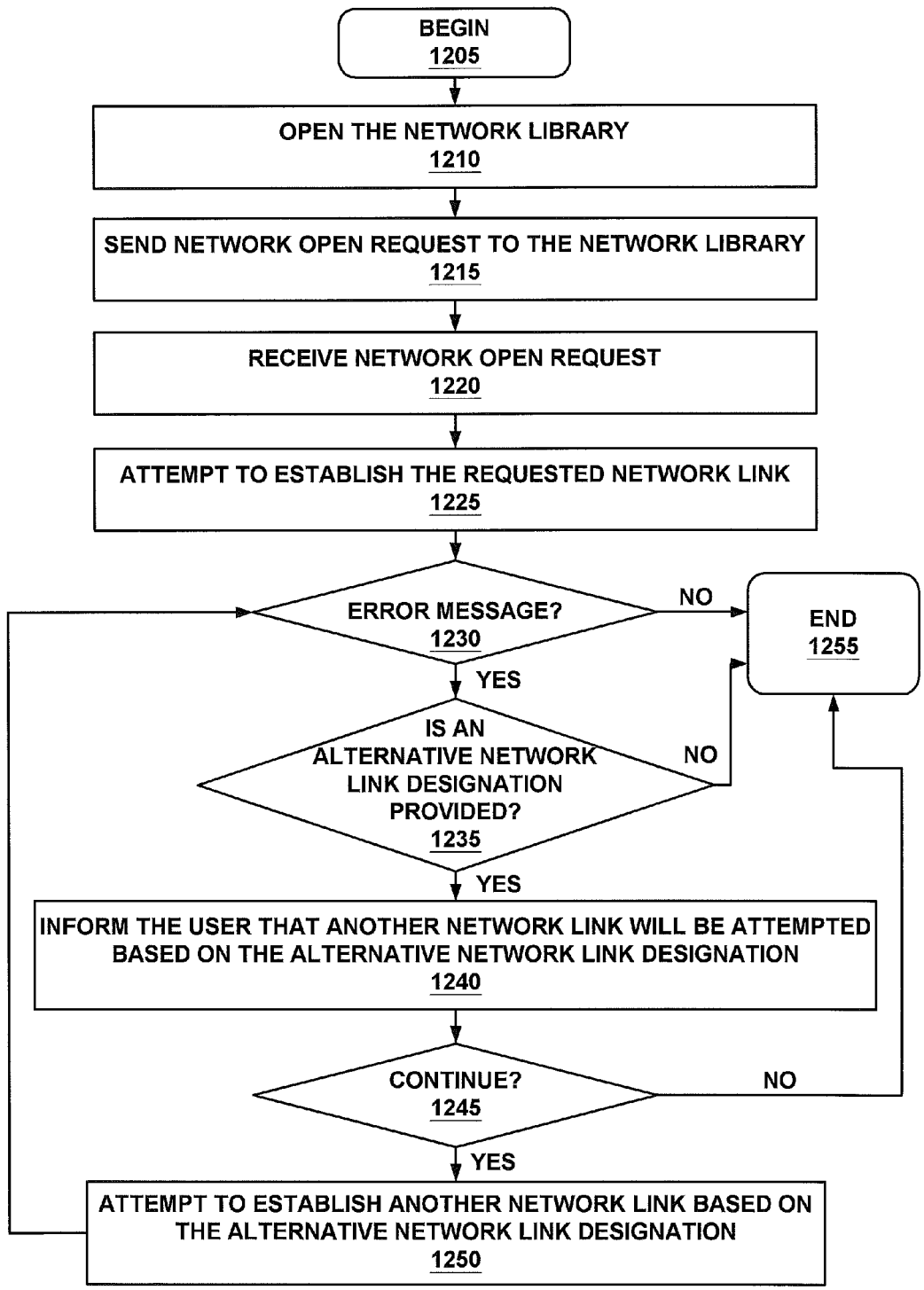
FIG. 15 illustrates a flow chart showing a method of establishing a network link on a personal digital assistant in accordance with an embodiment of the present invention.

FIG. 15 illustrates a flow chart showing a method 1200 of establishing a network link on a personal digital assistant 100 in accordance with an embodiment of the present invention. Reference is made to FIGS. 8-13.

At step 1205, the method 1200 in accordance with an embodiment of the present invention begins.

Continuing, at step 1210, an application on the personal digital assistant 100 opens the network library (described with respect to FIG. 8), whereas the network library has network open code that interfaces with the operating system to initiate and establish a requested network link.

Furthermore, at step 1215, the application sends a network open request to the network library so that the requested network link is initiated. At step 1220, the network library receives the network open request.

At step 1225, the personal digital assistant 100 attempts to establish the requested network link The personal digital assistant 100 initiates the requested network link by performing the network interface tasks (e.g., powering the modem, instructing the modem to dial a particular number, performing a handshake routine, etc.) that are required for the requested network link.

Moreover, at step 1230, the personal digital assistant 100 determines whether an error message was generated due to any of a variety of reasons (e.g., a network-related error, a time out error, a non-fatal operating system error), preventing the network link from being established. If the error message was not generated, the personal digital assistant 100 completes establishing the network link and the method 1200 proceeds to step 1255.

Otherwise, the method 1200 proceeds to step 1235. At step 1235, the personal digital assistant 100 determines the appropriate alternative network link designation based on the chain implementation, first loop implementation, or second loop implementation. In an embodiment, the network library receives the error message and determines the alternative network link designation corresponding to the network link. If the network link does not have an alternative network link designation or if there is no additional alternative network link, the method 1200 proceed to step 1255.

Otherwise, the method 1200 proceeds to step 1240. At step 1240, the personal digital assistant 100 informs the user that the requested network link cannot be established and that another network link will be attempted based on the alternative network link designation. In an embodiment, the message 900 (FIG. 13) is displayed, allowing the user to prevent the personal digital assistant 100 from proceeding to the alternative network link. Alternatively, the personal digital assistant 100 can proceed to the alternative network link without informing the user that the requested network link could not be established.

At step 1245, the personal digital assistant 100 determines whether the user desires the personal digital assistant 100 to continue to the alternative network link. If the user does not want the personal digital assistant 100 to continue to the alternative network link, the method proceeds to step 1255 and ends.

Otherwise, at step 1250, the personal digital assistant 100 attempts to establish another network link based on the alternative network link designation. The personal digital assistant 100 initiates the network link by performing the network interface tasks (e.g., powering the modem, instructing the modem to dial a particular number, performing a handshake routine, etc.) that are required for the network link. The method 1200 then proceeds to step 1230.

Those skilled in the art will recognize that portions of the present invention may be incorporated as computer instructions stored as computer program code on a computer-readable medium such as a magnetic disk, CD-ROM, and other media common in the art or that may yet be developed.

Finally, aspects of the present invention can be implemented as an application, namely, a set of instructions (e.g., program code) which may, for example, be resident in the random access memory of a computer system. Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. In addition, although the various methods of the present invention described above can be conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing a plurality of prioritized network links supported by an electronic system, the method comprising the steps of:

a) configuring, by an electronic system processor, a plurality of prioritized network links for the electronic system to utilize;
b) attempting a first network connection, by the processor of the electronic system, using a first network link having an initial priority; and
c) upon failure to establish the first network connection using the first network link, attempting to initiate a second network connection, by the processor of the electronic system, using a second network link having a lower priority than the first network link.

2. The method as defined in claim 1, wherein one of the plurality of prioritized network links is to a private telephony system.

3. The method as defined in claim 1, wherein one of the plurality of prioritized network links is to a private data network.

4. The method as defined in claim 1, wherein the plurality of prioritized network links are wireless networks.

5. The method as defined in claim 1, further comprising the step of monitoring the first network link.

6. The method as defined in claim 1, further comprising the step of monitoring the first network link while a network connection is established with another of the plurality of prioritized network links.

7. The method as defined in claim 6, further comprising the step of switching to the first network link if a network connection using the first network link can be established.

8. The method as defined in claim 1, further comprising the steps of monitoring a higher prioritized network link while a network connection is established with a lower prioritized network link; and
switching to the higher prioritized network link if a network connection using the higher prioritized network link can be established.

9. The method as defined in claim 1, further comprising the step of monitoring a connection status of the plurality of prioritized network links; and
switching to any higher prioritized network link than the established network link if a network connection using any higher prioritized network link can be established.

10. The method as defined in claim 1, further comprising the step of receiving at the electronic system a priority of the plurality of prioritized network links.

11. The method as defined in claim 1, wherein the first network is a cellular network.

12. The method as defined in claim 1, wherein the processor designates the last successful connection as a new first network.

13. The method as defined in claim 1, further comprising the step of upon failure to establish the second network connection, continuing to attempt initiating network connections according to priority until the plurality of prioritized network links are exhausted or a network connection is established.

14. An electronic system comprising:
a processor;
at least one communication interface coupled to the processor; and
a memory coupled to the processor, the processor configured to perform the steps of:
configuring a plurality of prioritized network links for at least one communication interface to utilize;
attempting to establish over the at least one communication interface a first network connection using a first network link having an initial priority;
upon failure to establish the first network connection using the first network link, attempting to initiate a second network connection over the at least one communication interface using a second network link having a lower priority than the first network link.

* * * * *